Figure 18:
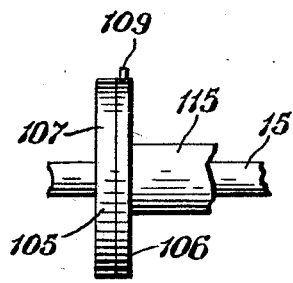

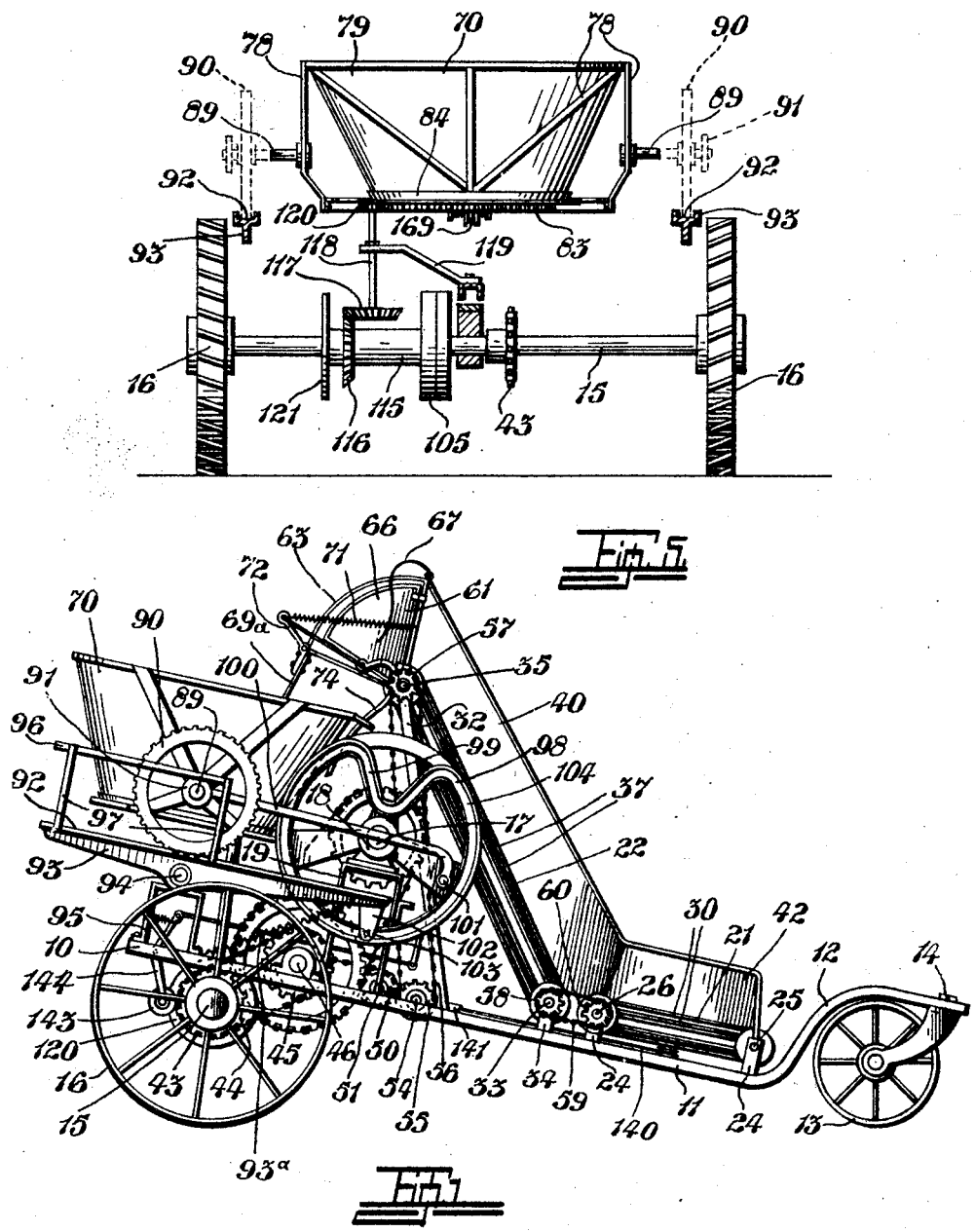

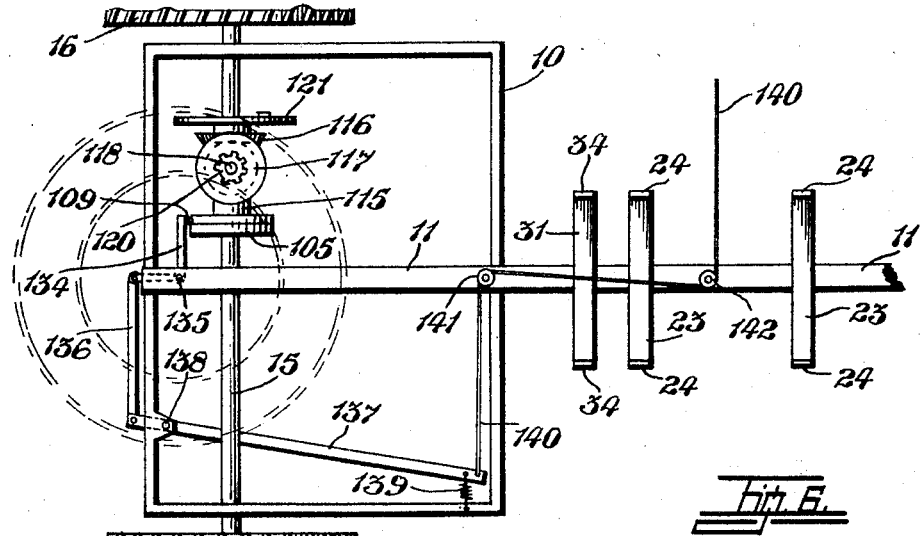
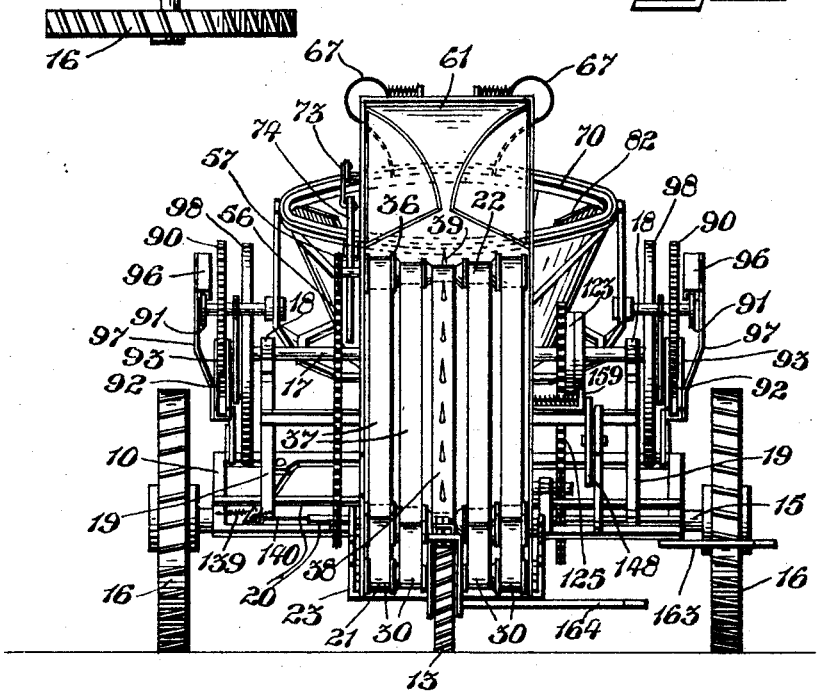

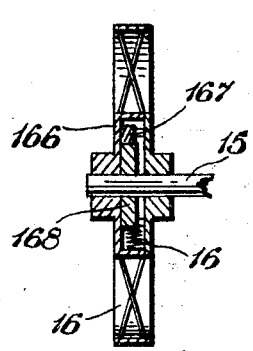
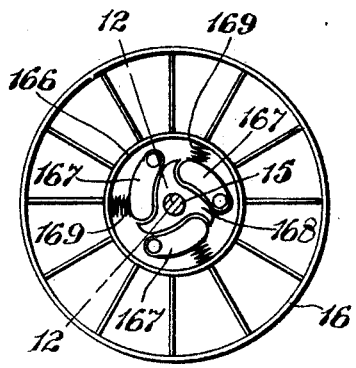
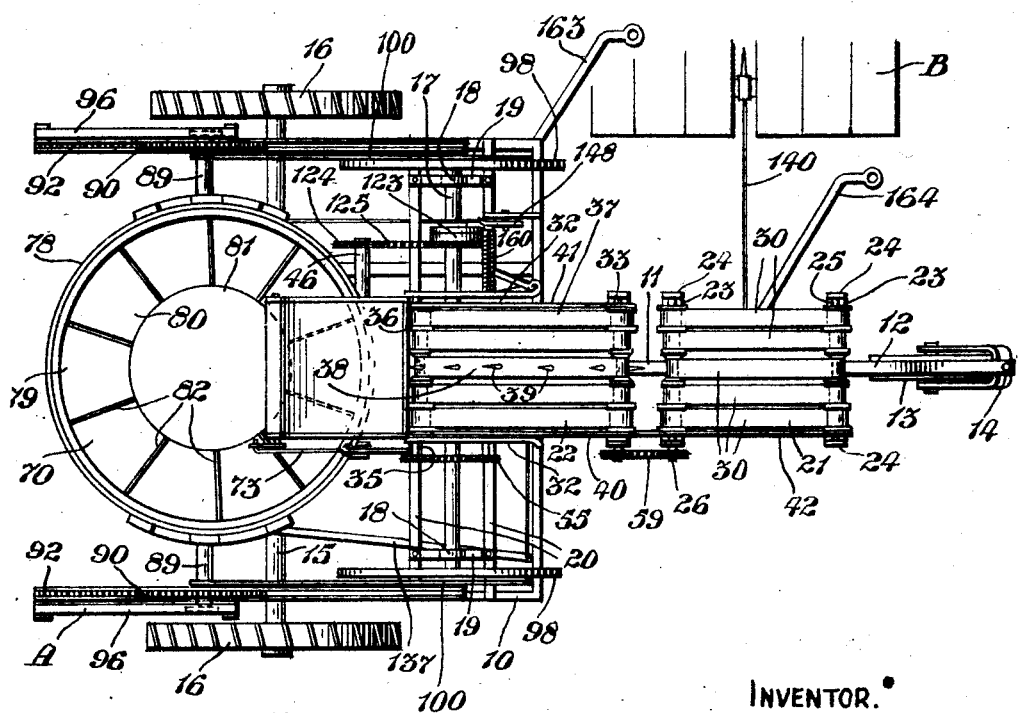

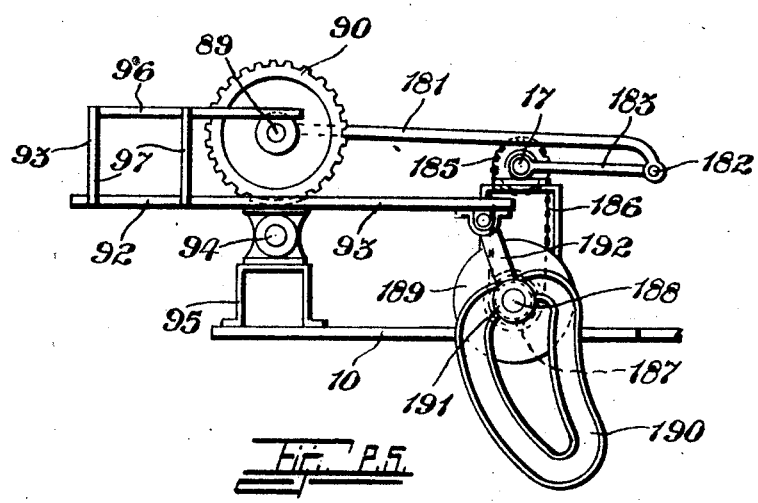
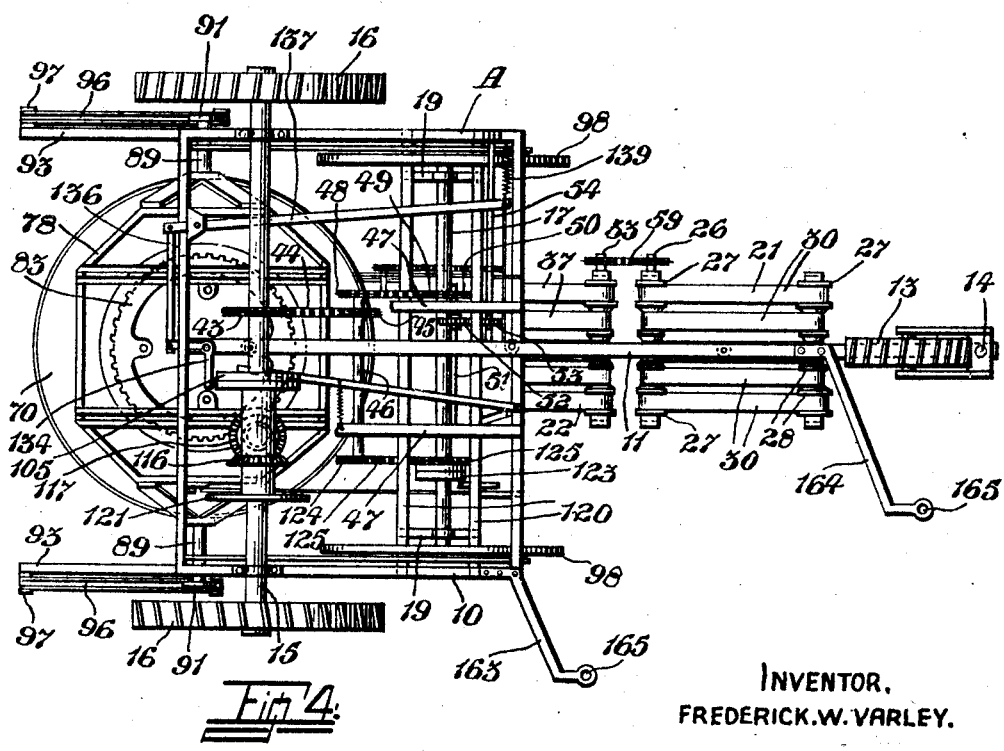

Feb. 12, 1929.
F. W. VARLEY
1,701,706
SHEAF SHOCKER
Filed Oct. 27, 1924 9 Sheets-Sheet 5
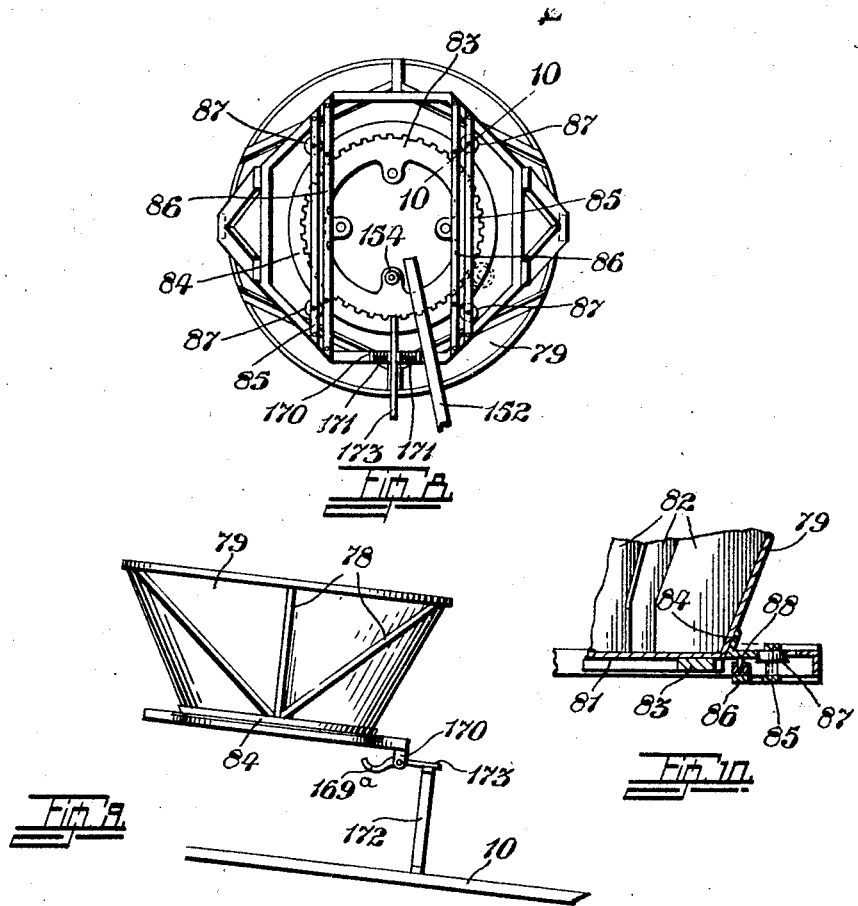
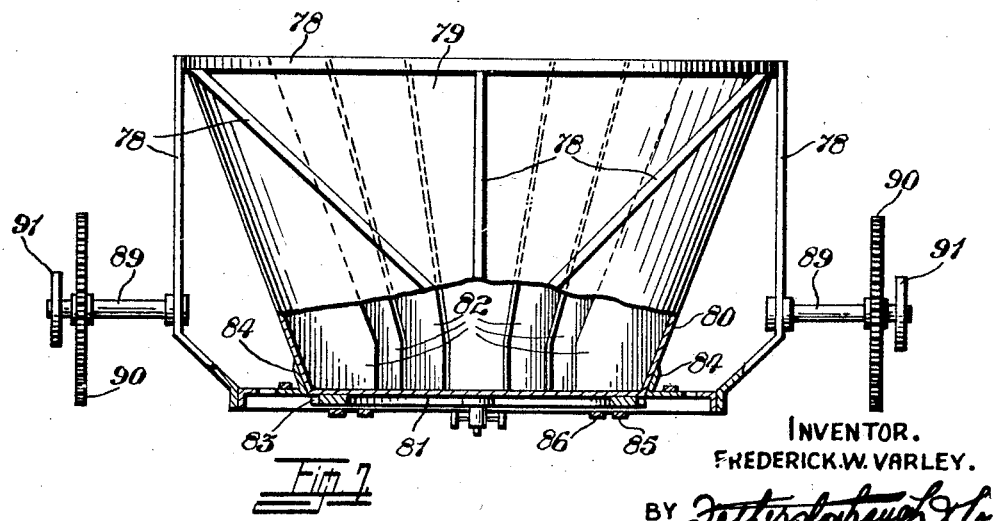
INVENTOR.
FREDERICK W. VARLEY.
BY Fetherstonhaugh & Co.
ATT'YS.

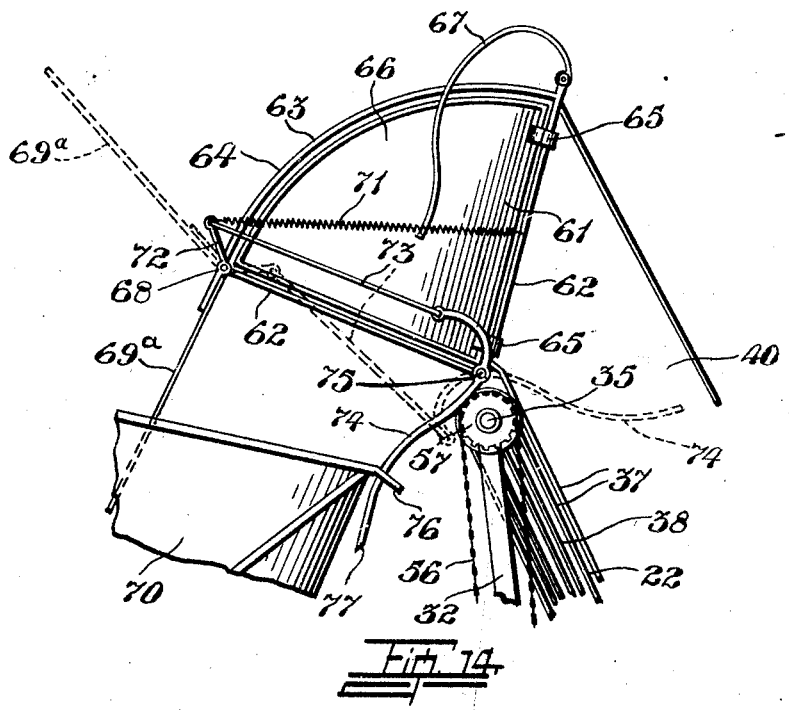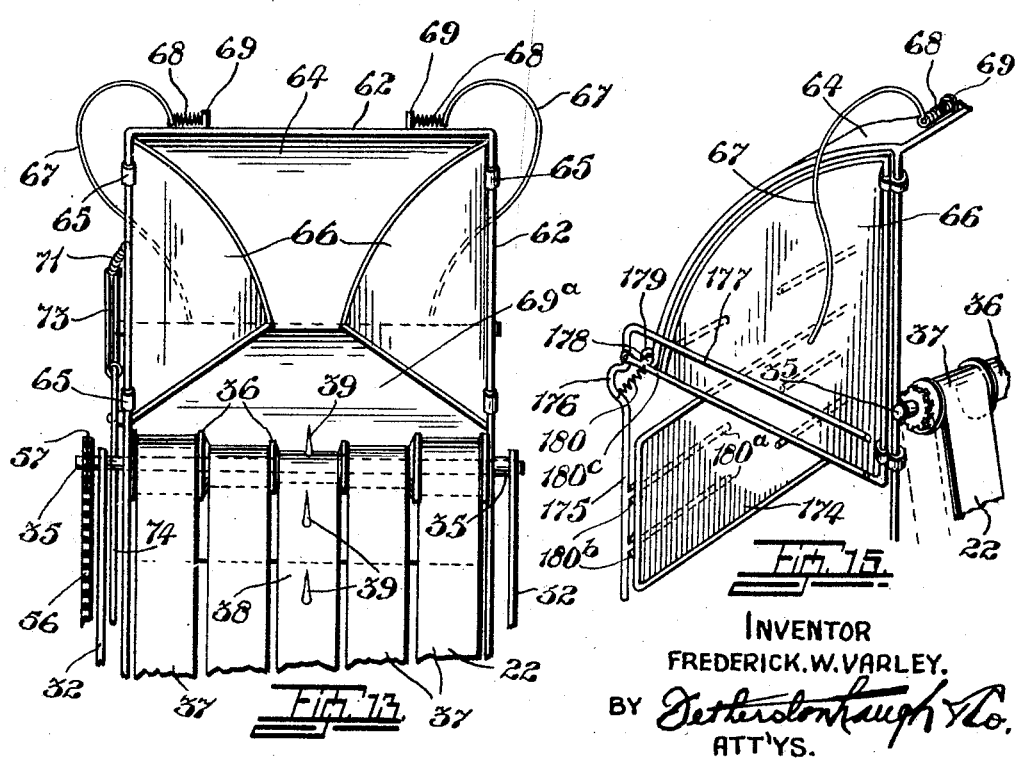

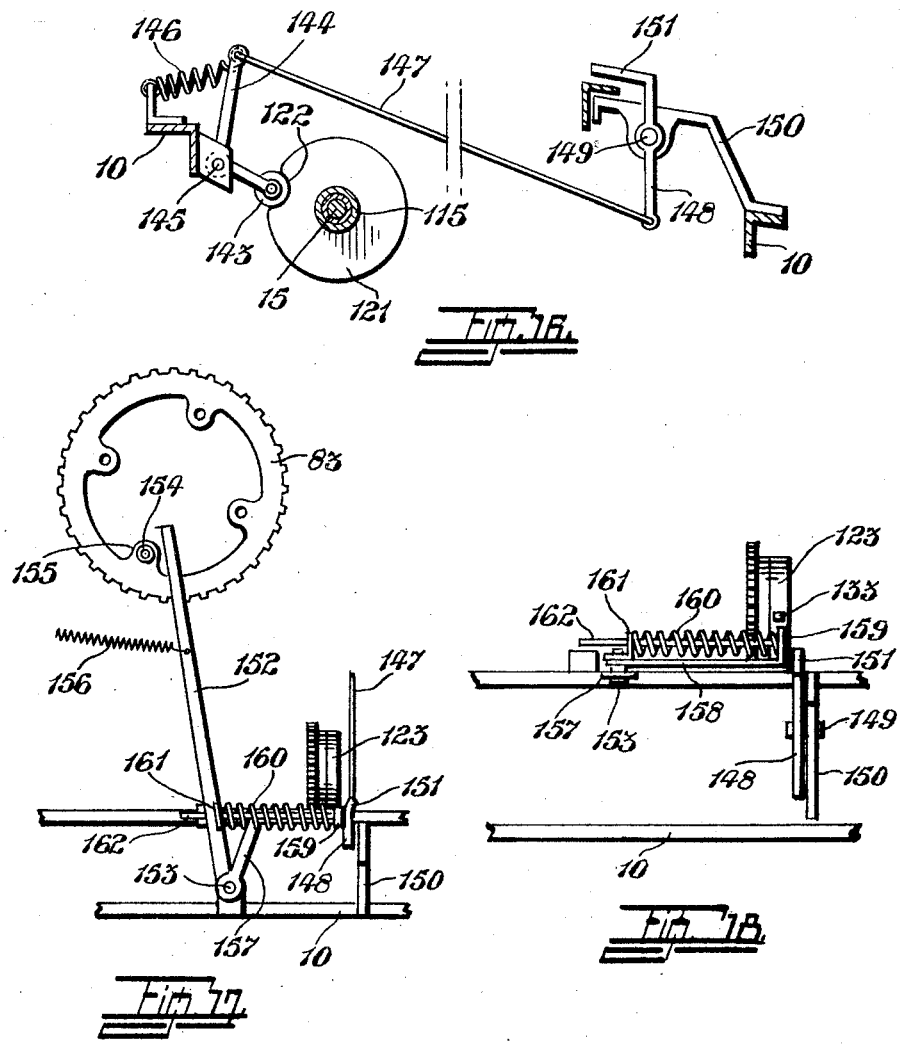

INVENTOR
FREDERICK W. VARLEY.
BY
ATT'YS.

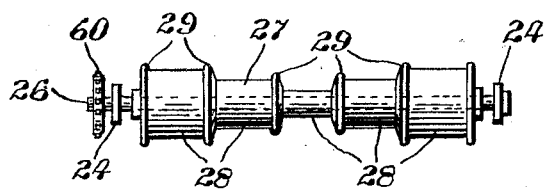
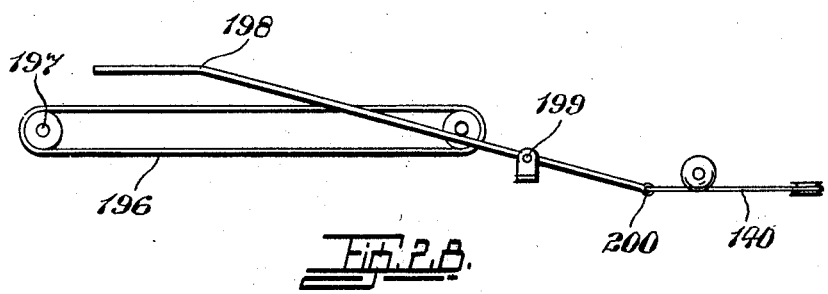
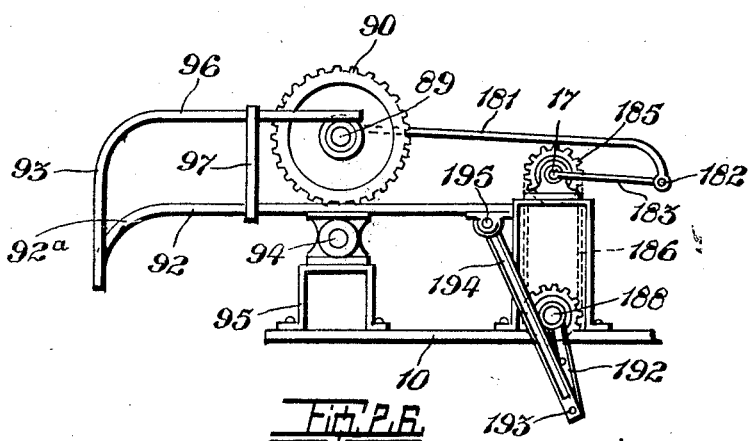

Patented Feb. 12, 1929.

1,701,706

UNITED STATES PATENT OFFICE.

FREDERICK WILLIAM VARLEY, OF KINCAID, SASKATCHEWAN, CANADA.

SHEAF SHOCKER.

Application filed October 27, 1924, Serial No. 746,161, and in Canada October 11, 1924.

This invention relates to improvements in sheaf shockers, particularly the detachable type which is automatically operable and has for its objects to provide a shocker of this character in which the sheaves are received from the binder individually and discharged in shock formation.

Further objects are to provide means whereby when the sheaves are received from the binder they are conveyed by suitable means to a stook forming basket or hopper and when a sufficient number of sheaves have been thus collected the basket or hopper is inverted and the sheaves dumped on the ground in shock formation.

Still further objects are to provide means automatically operable whereby the stook forming basket or hopper is intermittently rotatable and when it has made one complete revolution is automatically operated and inverted so that the sheaves are discharged on the ground in shock formation.

With the foregoing and other objects in view the invention consists essentially of a portably mounted frame having suitable means to detachably secure the shocker to the binder and means when the sheaves are delivered from the binder to elevate them to a hopper and clutch means automatically operable through the drive shaft whereby the hopper is rotated, tilted and inverted in order to discharge the sheaves on the ground in shock formation.

Referring now to the drawings in which like characters of reference indicate corresponding parts, Figure 1 is a side elevation of my improved sheaf shocker, Figure 2 is a front view of the same, Figure 3 is a plan view, Figure 4 is a plan view looking from the under side of the sheaf shocker, Figure 5 is a sectional elevation showing the relative position and means for rotating the hopper or stook-forming basket.

Figure 22:
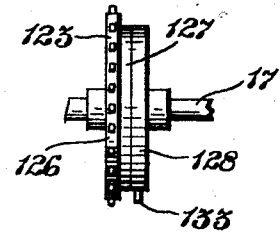
Figure 20:
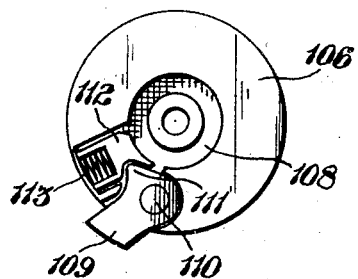
Figure 23:
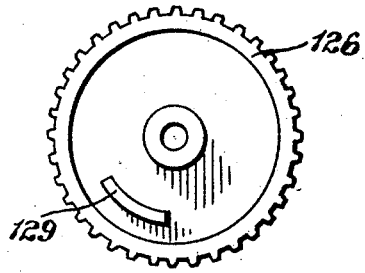
Figure 24:
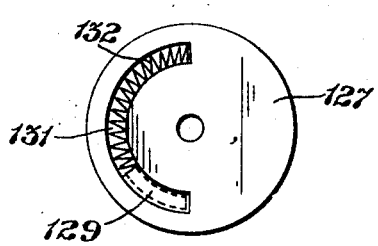
Figure 21:
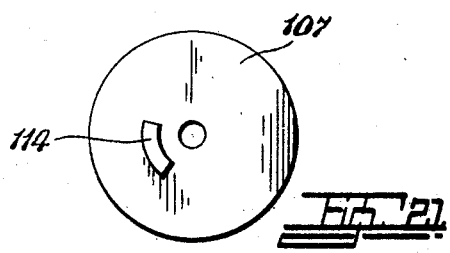

Figure 6 is a plan view illustrating the clutch operating mechanism and elevator mountings, Figure 7 is an enlarged end elevation of the hopper shown partly in section, Figure 8 is a plan view of the hopper as seen from the underside, Figure 9 is a side elevation of the hopper showing the retaining member out of engagement with the hopper gear, Figure 10 is a section on the line 10—10 of Figure 8, Figure 11 is an elevation of the traction wheel looking from the inside and showing the clutch mounted thereon, Figure 12 is a section on the line 12—12, Figure 13 is a front view of the sheaf guide, Figure 14 is a side view of the sheaf guide showing the sheaf guide plate, Figure 15 is a perspective view of a modified form of sheaf guide, Figure 16 is an elevation of the cam and operating members controlling the hopper operating clutch, Figure 17 is a plan of the hopper operating clutch together with the clutch operating means, the operating means being reversed for purposes of clarity, Figure 18 is a front view of Figure 17, Figure 19 is a plan view of the hopper rotating clutch, Figure 20 is a view of the inner face of the hopper rotating clutch member, Figure 21 is a view of the inner face of the hopper rotating clutch connecting member, Figure 22 is an end view of the hopper operating clutch, Figure 23 is a view of the inner face of the sprocket forming part of the hopper operating clutch, Figure 24 is a view of the face of the mid-member of the hopper operating clutch showing the shock absorbing means, Figure 25 is an elevation of a modified form of hopper operating mechanism, Figure 26 is an elevation of a further modified form of hopper operating mechanism, Figure 27 is a plan view of one of the elevator spools or rollers, Figure 28 is a side view partly in sections showing a modified form of mechanism for operating the hopper rotating clutch.

Referring now to the drawings in which the preferred form of my invention sheaf shocker is illustrated, A designates the improved sheaf shocker as a whole and B that portion of the binder known as the binder deck.

The sheaf shocker in general structure comprises a chassis or a frame 10 constructed of angle iron or other suitable material of substantially rectangular formation while extending transversely thereof is the beam 11.

This beam may be secured to the frame by bolts or the like and is adapted to extend forwardly of the frame, being curved as indicated at 12 to provide for a caster-wheel 13 which is pivotally mounted at 14. For general purposes of reference the frame supported by the caster-wheel will be known as the front of the sheaf shocker.

The chassis or frame 10 is carried by the axle shaft 15, mounted in suitable bearings thereon and supported by the traction wheels 16. This for general purposes will be known as the rear of the sheaf shocker.

Adjacent the forward side of the frame 10 is a shaft 17 rotatably mounted in bearings 18 adapted to be supported by brackets 19 secured by bolts or the like to the brace members 20 which extend lengthwise of and are secured to the frame 10.

Reference now being made to the means for carrying the sheaves to the basket after they are discharged from the binder deck, this comprises the conveyor 21 and the elevator 22. The conveyor 21 is positioned below and directly in line with the deck B of the binder and is composed of the cross braces 23 with up-turned ends 24. The braces are adapted to be secured to the beam 11, the ends 24 forming journals for the shafts 25 and 26 which have keyed thereon rollers 27.

As illustrated particularly in Figure 27 the rollers are made from a single piece of metal in the form of spools 28 each of varying diameters and are provided with flanges 29 to retain the conveyor belts 30 thereon when the device is in operation.

Adjacent the conveyor 21 and supported by the cross member 31 and the substantially vertical brace members 32 is an elevator 22. The lower shaft 33 of this elevator is journalled in the up-turned ends 34 of the cross member 31 while the upper shaft 35 is journalled in suitable bearings mounted on the braces 32.

The roller members 36 keyed to the shafts 33 and 35 are similar in construction to the rollers 27, illustrated in Figure 27, and are provided with endless belts 37 with a central belt 38 having secured thereon a plurality of sheaf engaging fingers 39.

As particularly illustrated in Figures 1 and 3 the elevator is provided with side guides 40 and 41 while the conveyor is provided with a single guide or butt plate 42. In addition to the side members 40 and 41 the elevator may be provided with a hinged cover or the like (not shown) which may be secured in any well known manner to these members.

When the sheaf shocker is in operation the elevator and conveyor are driven through a train of sprockets and gears, see Figures 1, 3 and 4. These comprise the sprocket wheel 43, keyed to the shaft 15 and connected by the chain 44 to the sprocket 45 which is in turn keyed to the shaft 46, the shaft 46 being rotatably mounted in suitable bearings secured to the cross members 47. The sprocket 48, positioned adjacent the sprocket 45, is also keyed to the shaft 46 and is connected by the chain 49 to the sprocket 50 which is keyed to the shaft 51. Adjacent the sprocket 50 and keyed to the shaft 51 is a gear wheel 52 adapted to mesh with the gear 53 keyed to the shaft 54. The sprocket 55 keyed to the shaft 54 is adapted to be connected through the chain 56 to the sprocket 57 which is keyed to and rotates the elevator shaft 35. The roller 36 mounted on the shaft 35 drives the belts 37 which in turn drive the roller 36 mounted on the shaft 33. The drive means for the conveyor comprise the sprocket 58, keyed to the shaft 33, and connected by the chain 59 to the sprocket 60 which is keyed to the conveyor shaft 26.

It will be seen then from the foregoing that the elevator and conveyor will be continuously in operation while the machine is moving in a forward direction. At the same time the gear wheels 52 and 53 operate to effect the necessary change in direction of rotation for the elevator and conveyor shafts.

Mounted on the brace 32 at the top of the elevator 22 and supported by the members 40 is a sheaf guide 61. This guide is adapted to assist in placing the sheaves in a substantially vertical position in the hopper and comprises a frame 62, the end of which is substantially triangular in formation having a curved rear wall 63 covered with galvanized iron or the like 64. Hingedly secured to the front of the frame 62, as at 65, are the doors 66 held normally in a semi-closed position by the fingers 67 actuated by the coil springs 68 secured in any well known manner by the bracket 69 to the frame 62. Pivotally mounted on the rear of the frame 62, as indicated at 68, is the sheaf guide plate 69$^a$. This plate extends into the hopper or shock forming basket 70 and is designed to assist the placing of sheaves in the hopper. In order that the plate 69$^a$ clear the hopper while being inverted the plate is operated by the spring 71 through the bell crank lever 72, link member 73 and the inverted and substantially J-shaped lever 74, pivotally mounted at 75, the extension or tail 77 of the lever 74 engaging a forked bracket member 76, secured to the skeleton frame of the hopper 70.

Coming now to the essential feature of my invention, namely, the means by which the sheaves are discharged in shock formation, this comprises the shock forming basket or hopper 70 previously referred to, formed of a skeleton frame 78, the top portion of which is circular while the lower or bottom portion is octagonal in formation. The skeleton frame is designed to carry a rotatably mounted and substantially inverted cone-shaped container 79 constructed of galvanized iron or other suitable material comprising the wall 80 and the base 81. As particularly illustrated in Figure 8, the inner periphery of the wall 80 is provided with equidistant spacing members 82 adapted to receive therebetween individual sheaves as they are delivered from the sheaf guide, while the base 81, as particularly illustrated in Figures 7, 8 and 10, has secured thereon a tooth gear wheel 83 and an annular flange 84, the purpose of which will be hereinafter made clear.

The base of the skeleton frame 78 is designed to retain and rotatably support the container 79. This is accomplished by means of strap members 85 and 86 extending crosswise on the face of the octagonal base, the members 85 retaining the grooved rollers 87 which are adapted to engage the outer periphery of the flange 84 while the members 86 support the rollers 88 which engage the under-face of the flange 84 the purpose of which is to decrease the friction during the rotation of the container 79.

The hopper, as a whole and as particularly illustrated in Figures 1, 2, 3 and 7, is provided with stub shafts 89 rigidly secured to the side of the skeleton frame 78 and have rigidly secured thereon the gear wheels 90, while the disc members 91 are loosely mounted adjacent thereto. The gears 90 are designed to mesh with the tooth rack 92 formed in the lower portion of the tilting members 93 which are pivotally mounted at 94 on the brackets 95 and the disc members 91 are adapted to travel in the inverted U-shaped channels 96 which are connected by braces 97 to the tilting members 93.

The hopper tilting and inverting means comprise the cam members 98 rigidly mounted on the shaft 17 and formed with substantially V-shaped depressions 99.

One end of the lever arm 100 is pivotally mounted, as at 101, on a web of the cam member 98 the other end of the arm being loosely connected on the shaft 89 while the bracket 102 secured to the end of the tilting member 93 is provided with a roller 103 which is adapted to travel in the guide-way 104 of the cam 98 the operation and purpose of which will be hereinafter made clear.

Means for rotating the container 79 as the sheaves are delivered individually thereto comprise the clutch 105 mounted substantially midway of the axle 15 and consist of two disc members 106 and 107. The disc 106 is loosely mounted on the shaft 15 and is provided with an annular recess 108. The trip engaging member 109, pivotally mounted at 110, is provided with a dog engaging projection 111 adapted to engage with the dog member 112 which is actuated by the spring 113.

The member 107 is rigidly secured to the shaft 15 and has upon its inner face an arcuate projection 114 adapted to travel in the annular recess 108 so that when the member 109 is released the spring 113 will force the member 112 inwardly when it will engage the projection 114 thus throwing the clutch into operation. In addition to the foregoing the disc member 106 is formed with a sleeve 115 upon which is mounted substantially midway thereof a bevel gear 116 meshing with a gear 117 keyed to the vertical shaft 118 which is supported by the bracket arm 119, the upper end of the shaft having keyed thereon the gear 120 which is adapted to mesh with the gear 83 of the hopper 70 while the member 121 provided with recess 122 is adapted to be secured to the end of the sleeve 115 in any well known manner. It should be here noted that the ratio of the gears 83 and 120 is the equivalent of the number of spaces in the container 79.

The clutch 123 is designed to rotate the shaft 17 at predetermined intervals. For this purpose power is transmited from the sprocket 126. As illustrated in Figures 22, 23 and 24 the clutch 123 comprises a sprocket 126 and a disc 127 loosely mounted on the shaft 17, and a second disc 128 rigidly mounted thereon. The inner face of the sprocket 126 is provided with an arcuate projection 129 formed as a lug operable in the arcuate recess 131 to engage and be actuated by the coil spring 132. The opposite face of the disc 127 is similar in construction to that illustrated in Figure 21 and the inner face of the disc 128 is similar in construction to that illustrated in Figure 20 and is provided with an engaging member 133, the coil spring 132 in the disc 127 acting as a shock absorber when the clutch is operated to rotate the shaft 17.

For the purpose of rotating, tilting and inverting the hopper 70, the clutches 105 and 123 and the disc 121 are brought into operation, the clutch 105 indirectly governing the operation of the clutch 123. For the operation of the clutch 105 I provide the bell crank 134 pivotally mounted at 135 one end of the arm engaging the trip member 109 while the other end is pivotally connected to the link member 136 which is in turn pivotally connected to the lever 137. The lever 137 is pivotally mounted on the rear of the frame 10 at 138 and extends to the front thereof where it is held in normal position by the coil spring 139 secured to the frame and the flexible cable 140 which extends over the pulleys 141 and 142 mounted on the beam 11 to be connected in any suitable manner to an operative portion of the knotter mechanism.

The operation of the knotter will therefore, through the cable 140, lever 137, link 136 and bell-crank 134 release the trip 109 and allow the clutch 105 to operate. The operation of the clutch 105 will cause the disc 121 to rotate which will force the roller 143 out of the recess 122. The roller 143 is rotatably mounted on one arm of the bell-crank 144 which is pivotally mounted on the bracket 145 secured to the frame 10 while the other arm is connected to the spring 146 secured to the frame and the link member 147 which extends transversely of the frame to pivotally connect with the lever arm 148, pivotally mounted at 149 on the brace 150, the arm 151 of the lever arm 148 extending at an obtuse angle therefrom the purpose of which will be hereinafter more fully referred to. The means for causing the clutch 123 to be automatically operated comprise the lever arm 152 pivotally mounted on the frame 10 the free end of which is adapted to be engaged by the roller 154 rotatably mounted on the lug 155 of the gear 83, the lever being retained in normal position, as illustrated in Figures 4 and 17, by the spring 156. Secured to the lever arm 152 at the pivotal point is a stub arm 157 formed with an obtuse angle extension 158, the end of which is bent at right angles to form the stop engaging member 159 which is adapted normally to engage the dog 133. The coil spring 160, as will be hereinafter more fully referred to, is adapted to release the member 159 from the dog 133 at a predetermined time. In order to effect this one end of the spring 160 butts the member 159 of the lever 157 while the other end butts the bracket 161 secured to the lever arm 152, the rod 162 acting as a guide to retain the spring in position. The rigid connecting straps 163 and 164 are secured to the frame 10 and beam 11 respectively and are designed for draft purposes being detachably connected to the binder through the eye 165 in any suitable manner.

In order that the traction wheel 16 will operate to rotate the shaft 15 only when the sheaf shocker is moved in a forward direction each wheel is provided with a clutch comprising a hollow drum 166 within which are housed the spring actuated and pivotally mounted dogs 167 adapted to be held in engagement with the member 168 by the coil springs 169. The member 168 is keyed or otherwise secured to the shaft 15 so that only on the forward movement of the shocker will the coil springs 169 hold the dog members 167 in engagement with the members 168 causing the shaft 15 to rotate with the wheels 16.

In operation the sheaf shocker is attached to the binder as previously described. On the binder moving forward in the regular way the grain will be tied and discharged from the binder deck to the conveyor 21 where it is carried to the elevator 22, the fingers 39 carrying the bundle and discharging it in the sheaf guide 61 where through the automatic operation of the doors 66 the sheaf is placed head downwards in one of the pockets formed by the spacing members 82. The knotter mechanism operating at this stage will exert a pull on the member 140 which will, through the lever 137 and link 136 and bell-crank lever 134, release the dog 109 permitting the clutch 105 to make one revolution. As the clutch rotates the gear 116 mounted on the sleeve 115 rotates with it causing the gear 117 to rotate which through the shaft 118 will cause the gear 120 to make one complete revolution. As the revolution of the shaft 15 is completed the lever 137 through the action of the spring 139 will engage the dog 109 throwing the clutch 105 out of engagement. As previously described the ratio of the gears 120 and 83 is such as to give the proper distance movement to the container 79 so that the sheaf lying directly under the sheaf-guide is moved to one side in order that the next empty pocket may be placed in position ready to receive the next sheaf. This operation is continued until such time as the pockets in the container are all filled. During the course of the filling of the container with sheaves the container 79 has made one complete revolution through the gear 83 carried thereon. Just as the revolution is completed the roller 154 on the gear 83, engages the lever arm 152 which is illustrated in Figure 17, moving the arm from left to right causing the spring 160 to be compressed, in the meantime exerting pressure on the trip 159. The lever 148 with engaging member 151 does not operate to release the member 159 until such time as the clutch 105, operated as previously described through the knotter mechanism, reaches the end of its operation. When the clutch 105 is operated the roller 143 is disengaged from the recess 122 by the rotation of the disc 120 which causes the bell-crank lever 144 to exert a pressure through the crank 147 on the lever 148 moving the member 151 downwards which holds the trip 159 in place until the roller 143 re-engages the recess 122 of the disc 121 whereupon the pressure on the crank 147 is removed, the member 151 releasing the trip 159. The spring 160 having been previously compressed by the operation of the lever arm 152 forces the trip 159 out of engagement with the dog 133 permitting the clutch 123 to operate the shaft 17. As the shaft 17 is rotated the arm 100, pivotally mounted on the cam 98, will cause the basket 70, through the gears 90 and rack 92, to move rearwardly and partially invert at the same time effecting the tilting movement of the hopper, the extension 77 of the lever 74 becomes disengaged from the fork member 76 and through the spring 71 and lever arm 72 causes the sheaf guide plate 69 to move upwardly (as shown in dotted lines) to clear the hopper so that it will not interfere with the movement of the hopper. The roller 103, rotatably mounted on the tilting member, travels in the guideway 104 of the cam 98, its movement being partially controlled by the tension spring $93^a$, secured to the frame 10 and to the front end of the member 93. The continued rotation of the shaft 17 has caused practically a complete inversion of the hopper 70. As the gear 120 is disengaged from the gear 83 by the movement of the hopper 70, the lever 169$^a$, pivotally mounted at 170 and actuated by springs 171 is released from the bracket 172 and engages the teeth of the gear 83, as particularly illustrated in Figure 8, thereby preventing a rotatable movement of the hopper during its inversion. By the continued rotation of the cam 98 the depression 99 of the cam comes in contact with the roller 103 giving the hopper 70 through the tilting member 93 a sudden downward and upward movement which deposits the sheaves in shock formation on the ground. The continued rotation of the shaft 17 restores the hopper to its normal position as illustrated in Figure 1, the extension 77 of the lever 74 engaging the fork member 76 and returning the sheaf guide plate 69$^a$ to its normal position, and at the same time the arm 173 engaging the bracket 172 will cause the lever 169$^a$ to become disengaged from the teeth of the gear 83, and the gear 120 meshing with the gear 83 restores the operative mechanism to normal position ready to receive further sheaves from the binder.

In Figure 15 is illustrated a modified form of sheaf guide. This comprises a sheaf guide plate 174 suspended in the hopper by the centrally divided rods 180$^a$ projected integrally from the rods 175 and passing through loops 180$^b$. The rods 175 are formed with semi-circular portions 176 and forwardly extending arms 177. At the upper commencement of the semi-circular portion 176, the rods 175 are pivoted to a rearward extension in rod or other suitable formation on the lower rim 180$^c$ of the side doors 66 by means of the centrally divided rod 178 formed integral with rod 175, while the plate 174 as a whole is pivotally suspended by the centrally divided rod 178 mounted in the loops 179 integral with the rear of the sheaf guide, and held in normal position by the springs 180 secured between the semi-circular portion 176 and the rim 180$^c$ as shown. Thus the side doors 66 may open and close integrally with rods 175 and 177 without disturbing materially the suspension of the plate 174. The modified form operates in a manner similar to the sheaf guide plate previously described. On the return movement of the hopper 70 the rim thereof contacts with the arm 177 causing the plate 174 to assume normal position.

The modified form of hopper tilting means, as illustrated in Figure 25, comprises an arm 181, loosely mounted on the shaft 89 and pivotally connected at 182 to the connecting arm 183 which is keyed or otherwise secured to the shaft 17. Adjacent the arm is a sprocket 185 connected by the chain 186 to the sprocket 187 which is mounted on the shaft 188. The disc 189 also mounted on the shaft 188 has connected thereto a channel member 190 within which is adapted to travel the roller 191 connected through the arm 192 to the tilting member 93, the operation of the modification being similar to that described in the preferred form, the cam 190 giving the required dip on the inversion of the hopper.

A further modification of hopper operating means is illustrated in Figure 26 in which the shaft 188 has rigidly secured thereon an arm 192 to which is pivotally mounted at 193 the arm 194 in turn pivotally connected at 195 to the tilting member 93 the operation of this being similar to that already described, the final sudden dip of the hopper being effected by means of the curve 92$^a$ of the track 92.

In Figure 28 a modified form of trip member is illustrated for operating the clutch 105. For this purpose the belts 30 are replaced by a pair of endless belts 196 mounted on the rollers 197. Between these belts and adapted to extend thereabove is a lever arm 198 pivotally mounted at 199 and connected at 200 by the flexible cable 140. In operation the sheaf as it is discharged from the binder deck drops on the lever 198 depressing it thereby exerting a pull on the cable 140 which operates the clutch 105 as previously described.

As many changes could be made in the above construction and many apparently widely different embodiments of my invention, within the scope of the claims, constructed without departing from the spirit or scope thereof, it is intended that all matter contained in the present specification and accompanying drawings shall be interpreted in an illustrative and not in a limiting sense.

What I claim as my invention is:

1. A sheaf shocker for the stooking of grain comprising, a frame, tiltable members pivotally mounted on the frame adapted to invertably support a sheaf receiving hopper comprising a toothed guide-way and a channel guide-way and means for causing the tiltable members to simultaneously swing on their pivotal point during operation.

2. A sheaf shocker for the stooking of grain including, a frame, a drive shaft, a secondary shaft, a sheaf receiving member movably and invertably supported on a pair of pivotally supported tilting members, and cam means mounted on the secondary shaft adapted to effect the moving, tilting and inversion of the sheaf-receiving member.

3. A sheaf shocker for the stooking of grain comprising in combination, a portably mounted frame and drive shaft having a clutch mounted thereon, a disc member for the clutch having an annular recess therein, pivotally mounted and spring-actuated members mounted in the disc member, a secondary disc member having a projection thereon adapted to travel in the annular recess of the first disc member, a sleeve formed integral with the first disc member, a gear and a disc member secured to the sleeve member and means connected with the binder whereby the pivotally mounted clutch member is adapted to be released simultaneous with the discharge of each sheaf from the binder.

4. A sheaf shocker for the stooking of grain comprising in combination a frame and a secondary shaft, a clutch on said shaft comprising a sprocket wheel having an integral arcuate projection formed thereon, a disc member formed with an arcuate recess adapted to house herein the arcuate projection and a shock absorbing compression spring, the opposite side of said disc having a secondary integral arcuate projection adapted to travel in an annular recess formed in a secondary disc member, a pivotally mounted dog and a spring actuated dog, in the secondary disc adapted to engage and disengage the arcuate projection of the first mentioned disc to cause the clutch to operate.

5. A sheaf shocker for the stooking of grain comprising, a frame, a secondary shaft mounted on the frame, cam members mounted on the secondary shaft having thereon substantially V-shaped offsets and a guide-way extending around the periphery of the cam.

6. A sheaf shocker for the stooking of grain comprising a sheaf receiving member including a hopper and a sheaf guide having hingedly mounted normally converging door members, a pivotally mounted butt member adapted to direct the sheaves into the hopper, means automatically operable for raising the butt member during the shock dumping operation and means for automatically restoring the butt to normal position on the return movement of the sheaf-receiving member.

7. A sheaf shocker for the stooking of grain comprising, a frame, tilting members pivotally mounted on the frame, sheaf-receiving means pivotally and invertably mounted on the tilting members, a secondary shaft, cam members mounted on said shaft, means for co-actively tilting and inverting and lowering the sheaf-receiving member, means for suddenly dipping the sheaf-receiving member while in an inverted and lowered position and means for restoring the sheaf-receiving member to normal position.

8. In a sheaf shocker for the stooking of grain a frame having a drive shaft mounted thereon, a clutch and a disc member on the drive shaft, a secondary shaft having a clutch mounted thereon, tilting members pivotally mounted on the frame adapted to carry tiltable and invertable sheaf receiving means, means connected with the binder adapted to operate the drive shaft clutch, coincident with the discharge of each from the binder to intermittently rotate the sheaf-receiving means, means carried by the rotating sheaf-receiving member adapted to operate the clutch on the secondary shaft upon the complete rotation of the sheaf receiving member.

9. A sheaf shocker for the stooking of grain including a conveyor and an elevator, comprising shafts for the elevator and conveyor, supporting and journalling means for the shafts, plurality of rollers mounted on the shafts in spool formation, a plurality of belts mounted on the spools and means for guiding the sheaves during conveying and elevating operation.

10. A sheaf shocker for the stooking of grain comprising, a portably mounted frame, a sheaf receiving member, a drive shaft having a clutch thereon, a secondary shaft having a clutch and cam wheels mounted thereon, means connected to the binder for operating the drive shaft clutch coincident with the discharge of each sheaf from the binder and means indirectly operable from the drive shaft clutch to operate the secondary shaft clutch, to cause alternately the inverting, tilting downwardly moving and suddenly dipping of the sheaf receiving member, and for restoring it to normal sheaf receiving position.

11. A sheaf shocker for the stooking of grain comprising, a frame, a drive shaft rotatably mounted on the frame, a clutch mounted on the drive shaft, a sleeve on the clutch, a disc member engaging the sleeve having a recess therein, a spring actuated lever arm having a roller thereon adapted to engage the disc member whereby on the clutch member being intermittently operated the lever arm is operated simultaneously to limit the rotation of the hopper.

12. A sheaf shocker for the stooking of grain including, a frame, a drive shaft, having a clutch thereon, a secondary shaft having a clutch mounted thereon and a rotatably mounted sheaf-receiving hopper, means connected with the binder adapted to operate the drive shaft clutch coincident with the discharge of each sheaf from a binder and means for operating the secondary clutch at predetermined intervals simultaneously with a predetermined number of operations of the drive shaft clutch.

13. A sheaf shocker of the character described comprising, a frame, a secondary shaft, a clutch operably mounted on the secondary shaft including a sprocket having an integral projection thereon, a disc member having means to engage the sprocket wheel projection, means to absorb the shock when the projection contacts, and means for causing the projection to contact.

14. An improved sheaf shocker of the character described for the stooking of grain comprising, in combination, a frame, a drive shaft rotatably mounted on the frame, a rotatable sheaf-receiving hopper, a gear mounted on the base of the hopper, a clutch on the drive shaft including a sleeve, a mitre gear on the sleeve, a vertical shaft, a mitre gear on the vertical shaft adapted to mesh with the sleeve mitre gear and trip means connected with the binder to engage the drive shaft clutch whereby the hopper is intermittently rotated coincident with the discharge of each sheaf from the binder.

In witness whereof I have hereunto set my hand.

FREDERICK WILLIAM VARLEY.